US011743550B2

(12) United States Patent
Atkins et al.

(10) Patent No.: US 11,743,550 B2
(45) Date of Patent: Aug. 29, 2023

(54) VIDEO CONTENT TYPE METADATA FOR HIGH DYNAMIC RANGE

(71) Applicant: Dolby Laboratories Licensing Corporation, San Francisco, CA (US)

(72) Inventors: Robin Atkins, Vancouver (CA); Per Jonas Andreas Klittmark, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/617,537

(22) PCT Filed: Jun. 26, 2020

(86) PCT No.: PCT/US2020/039969
§ 371 (c)(1),
(2) Date: Dec. 8, 2021

(87) PCT Pub. No.: WO2020/264409
PCT Pub. Date: Dec. 30, 2020

(65) Prior Publication Data
US 2022/0264190 A1 Aug. 18, 2022

Related U.S. Application Data

(60) Provisional application No. 62/868,070, filed on Jun. 28, 2019.

(30) Foreign Application Priority Data

Jun. 28, 2019 (EP) .................................. 19183269

(51) Int. Cl.
*H04N 21/485* (2011.01)
*H04N 21/435* (2011.01)
*H04N 21/84* (2011.01)

(52) U.S. Cl.
CPC ....... *H04N 21/4854* (2013.01); *H04N 21/435* (2013.01); *H04N 21/84* (2013.01)

(58) Field of Classification Search
CPC ... H04N 21/4854; H04N 21/435; H04N 21/84
See application file for complete search history.

(56) References Cited

U.S. PATENT DOCUMENTS 6,771,323 B1 8/2004 Dean
8,280,222 B2 10/2012 Hardacker
(Continued)

FOREIGN PATENT DOCUMENTS

CN 104954831 A 9/2015
WO 2019050972 A2 3/2019

OTHER PUBLICATIONS

"EBU Core metadata 15 set (EBUCore)," specification v1.9, MIM-AI, EBU, Jan. 2019).
(Continued)

*Primary Examiner* — Kyu Chae

(57) ABSTRACT

Apparatus and methods for providing solutions to the problem of preserving original creative intent for video playback on a target display are presented herein. According to one aspect, a video bitstream includes metadata with a flag indicative of creative intent for a target display. This metadata may include numerous fields that denote characteristics such as content type, content sub-type, intended white point, whether or not to use the video in Reference Mode, intended sharpness, intended noise reduction, intended MPEG noise reduction, intended Frame Rate Conversion, intended Average Picture Level, and intended color. This metadata is designed to make it effortless for the content creators to tag their content. The metadata can be added to the video content at multiple points, the status of the flag is set to
(Continued)

TRUE or FALSE to indicate whether the metadata was added by the content creator or a third party.

13 Claims, 10 Drawing Sheets

(56) References Cited

U.S. PATENT DOCUMENTS

| | | | |
|---|---|---|---|
| 8,482,614 | B2 | 7/2013 | Dean |
| 8,488,901 | B2 | 7/2013 | Berestov |
| 8,904,469 | B2 | 12/2014 | Blackwell |
| 9,241,191 | B2 | 1/2016 | Shim |
| 9,654,757 | B2 | 5/2017 | Saari |
| 9,900,663 | B2 | 2/2018 | Kim |
| 11,490,157 | B2 | 11/2022 | Peng |
| 2003/0007001 | A1 | 1/2003 | Zimmerman |
| 2008/0043031 | A1 | 2/2008 | Jagmag |
| 2009/0064267 | A1 | 3/2009 | Lee |
| 2010/0013855 | A1 | 1/2010 | Allen |
| 2010/0013996 | A1 | 1/2010 | Kang |
| 2010/0103327 | A1 | 4/2010 | Lentz |
| 2010/0128067 | A1 | 5/2010 | Lee |
| 2012/0134548 | A1 | 5/2012 | Rhoads et al. |
| 2012/0315011 | A1 | 12/2012 | Messmer et al. |
| 2012/0321273 | A1 | 12/2012 | Messmer |
| 2016/0100147 | A1 | 4/2016 | Kim |
| 2016/0156965 | A1 | 6/2016 | Oh |
| 2017/0006351 | A1* | 1/2017 | Haberman ........... H04N 21/435 |
| 2017/0366791 | A1 | 12/2017 | Andrivon |
| 2018/0376194 | A1 | 12/2018 | Oh |
| 2019/0075325 | A1 | 3/2019 | Hwang |
| 2020/0037042 | A1* | 1/2020 | Colsey ............. H04N 21/41407 |
| 2021/0281718 | A1 | 9/2021 | Yang |

OTHER PUBLICATIONS

Bailer, Werner "Proposed Updates to the text of CD of ISO/IEC 23000-15 (MP-AF)" ISO/IEC JTC1/SC29/WG11 MPEG2014/M33910 Jul. 2014, Sapporo, Japan.

ITU-R BT. 2390, "High dynamic range television for production and international programme exchange," ITU, 2016.

Lim, Y. et al "OMAF: Metadata for Maintaining Creative Intent in ROI Rendering" 17. MPEG Meet! Ng; Jan. 16, 2017 Jan. 20, 2017; Geneva; (Motion Picture Expert Group or ISO/IEC JTC1/SC29/WG11) Jan. 12, 2017.

Liu, T. et al "Realtime Content Analysis and Adaptive Transmission of Lecture Videos for Mobile Applications" Proc. of the 12th ACM, published Oct. 2004, pp. 1-4.

* cited by examiner

| CONTENT TYPE | | WHITE POINT/ COLOR TEMPERATURE | FRAME RATE CONVERSION | SHARPNESS/ DETAIL ENHANCEMENT | NOISE REDUCTION | MPEG NOISE REDUCTION |
|---|---|---|---|---|---|---|
| 0 | DEFAULT | | | | | |
| 1 | CINEMA | | | | | |
| 2 | GAME | | | | | |
| 3 | SPORT | | | | | |
| 4 | PHOTO/WALLPAPER | | | | | |
| 5 | GRAPHICS/PC/COMPUTER | | | | | |
| 6 | ALL OTHER | | | | | |

| CONTENT TYPE | DESCRIPTION | CONTENT SUB-TYPE | DESCRIPTION |
|---|---|---|---|
| 0 | DEFAULT | 0 | DEFAULT |
| 1 | CINEMA | 0 | DEFAULT |
| | | 1 | ANIMATION |
| | | 2 | LIVE ACTION |
| | | 3 | CLASSIC |
| | | 4-15 | RESERVED |
| 2 | GAME | 0 | DEFAULT |
| | | 1 | ACTION |
| | | 2 | SPORT |
| | | 3-15 | RESERVED |
| 3 | SPORT | 0 | DEFAULT |
| | | 1 | FIELD |
| | | 2 | INDOOR COURT |
| | | 3 | WATER |
| | | 4 | ICE/SNOW |
| | | 5-15 | RESERVED |
| 4 | PHOTO/WALLPAPER | 0 | DEFAULT |
| 5 | GRAPHICS/PC/COMPUTER | 0 | DEFAULT |
| 6 | ALL OTHER | 0 | DEFAULT |
| | | 1 | NEWS |
| | | 2 | USER GENERATED |
| | | 3 | MUSIC VIDEO |
| | | 4-15 | RESERVED |
| 7-15 | RESERVED | 0 | DEFAULT |

| INTENDED SHARPNESS | DESCRIPTION |
|---|---|
| 0 | DEFAULT |
| 1 | OFF |
| 2 | MEDIUM |
| 3 | HIGH |

FIG. 10 — 1000, 1010

| INTENDED NOISE REDUCTION | DESCRIPTION |
|---|---|
| 0 | DEFAULT |
| 1 | OFF |
| 2 | MEDIUM |
| 3 | HIGH |

FIG. 11 — 1100, 1110

| INTENDED MPEG NOISE REDUCTION | DESCRIPTION |
|---|---|
| 0 | DEFAULT |
| 1 | OFF |
| 2 | MEDIUM |
| 3 | HIGH |

FIG. 12 — 1200, 1210

| INTENDED FRAME RATE CONVERSION | DESCRIPTION |
|---|---|
| 0 | DEFAULT |
| 1 | OFF |
| 2 | MEDIUM |
| 3 | HIGH |

FIG. 13 — 1300, 1310

| INTENDED AVERAGE PICTURE LEVEL | DESCRIPTION |
|---|---|
| 0 | DEFAULT |
| 1 | LOW |
| 2 | MEDIUM |
| 3 | HIGH |

FIG. 14 — 1400, 1410

| INTENDED COLOR SATURATION | DESCRIPTION |
|---|---|
| 0 | DEFAULT |
| 1 | LOW |
| 2 | MEDIUM |
| 3 | HIGH |

# VIDEO CONTENT TYPE METADATA FOR HIGH DYNAMIC RANGE

CROSS-REFERENCE TO RELATED APPLICATIONS

This application is a U.S. National Stage of International Application No. PCT/US2020/039969, filed Jun. 26, 2020, which claims priority to U.S. Provisional Patent Application Ser. No. 62/868,070, filed on Jun. 28, 2019 and EP Patent Application Serial No. 19183269.0, filed on Jun. 28, 2019, each of which is hereby incorporated by reference in its entirety.

TECHNICAL FIELD

The present disclosure relates generally to images. More particularly, an embodiment of the present disclosure relates to video content type metadata.

BACKGROUND

As used herein, the term dynamic range may relate to a capability of the human visual system to perceive a range of intensity (e.g., luminance, luma) in an image, e.g., from darkest blacks (darks) to brightest whites (highlights). In this sense, dynamic range relates to a 'scene-referred' intensity. Dynamic range may also relate to the ability of a display device to adequately or approximately render an intensity range of a particular breadth. In this sense, dynamic range relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a dynamic range breadth that spans the some 14-15 orders of magnitude of the human visual system. In practice, the dynamic range over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the dynamic range that is simultaneously perceivable by a human visual system. As used herein, EDR may relate to a dynamic range that spans five to six orders of magnitude. Thus, while perhaps somewhat narrower in relation to true scene referred HDR, EDR nonetheless represents a wide dynamic range breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays support a luminance of 200 to 300 cd/m² or nits. Most consumer HDTVs range from 300 to 1000 cd/m². Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more).

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

As used herein, the term "display management" includes, but is not limited to, the processing (e.g., tone and gamut mapping) involved to map an input video signal of a first dynamic range (e.g., one thousand nits) to a display of a second dynamic range (e.g., five hundred nits).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

SUMMARY

Apparatus and methods according to the present disclosure provide solutions to the problem of preserving the creative intent of the video at a decoder or a target display. According to an embodiment of the present disclosure, a video bitstream includes metadata that communicates to a decoder or a target display the type of the video content within the bitstream. This metadata may include numerous fields that denote characteristics of the video content such as content type and content sub-type which cause the target display to apply a corresponding display mode with associated display settings. The target display may apply further adjustments to individual display settings based on fields in the metadata that define, for example, an intended white point, whether or not to use the video in Reference Mode, intended sharpness, intended noise reduction, intended MPEG noise reduction, intended Frame Rate Conversion, intended Average Picture Brightness Level, and intended color. A number of fields are added within the metadata with a specific hierarchy. The hierarchy of the fields causes a further refinement of display settings that have already adjusted by a field assigned to a higher level in the hierarchy. For example, a content type may cause basic adjustment of particular display settings on the first hierarchical level. Upon selecting a more specific content sub-type on the second hierarchical level, a portion of the display settings are further adjusted according to the particularities of the selected content sub-type. On the third hierarchical layer, fields cause individual adjustments of particular display settings. This metadata is designed to make it effortless for the content creators to tag their content. Depending on the effort spent, the content creators may apply basic adjustments by simply selecting an appropriate content type and, optionally, a content sub-type. However, they may also apply further adjustments, on an individual level that directly affects particular display settings on the target display.

The metadata allows for multiple points where the metadata can be added to the video content. In order to identify whether the original content creator has defined the metadata, the metadata contains a reference mode flag that can be set to TRUE or FALSE. The reference mode flag is set to TRUE if the original content creator added the metadata, thereby indicating that applying the metadata at the target display preserves the creative intent. The flag is set to FALSE if someone other than the original content creator added the metadata.

According to a first aspect of the present disclosure, a method of generating a digital video bitstream with metadata is presented, wherein the metadata include a reference mode flag indicative of whether one or more category fields in the metadata cause a target display to select display settings for displaying the video content in a reference mode, the reference mode representing a display mode having display settings that preserve a creative intent of the creator of the video content, the method comprising setting one or more category fields in the metadata indicative of a category of the video content of the digital video bitstream, wherein the one or more category fields cause a target display to select display settings for displaying the video content in a display mode corresponding to the category of the video content, and setting the reference mode flag in the metadata to indicate whether or not the one or more category fields are indicative of the reference mode.

According to a second aspect of the present disclosure, a digital video bitstream is presented, comprising a video content and metadata. The metadata include one or more category fields indicative of a category of the video content of the digital video bitstream, wherein the one or more category fields cause a target display to select display settings for displaying the video content in a display mode corresponding to the category of the video content, and a reference mode flag indicative of whether or not the one or more category fields cause a target display to select display settings for displaying the video content in a reference mode, the reference mode representing a display mode having display settings that preserve a creative intent.

DESCRIPTION OF THE DRAWINGS

FIG. 6 illustrates an example of the disclosed metadata typical picture mode settings in tabular form.

FIG. 7 illustrates an example of details of the disclosed metadata content sub-type in tabular form.

FIG. 9 illustrates an example of details of the disclosed metadata intended sharpness in tabular form.

FIG. 10 illustrates an example of details of the disclosed metadata intended noise reduction in tabular form.

FIG. 11 illustrates an example of details of the disclosed metadata intended MPEG noise reduction in tabular form.

FIG. 12 illustrates an example of details of the disclosed metadata Frame Rate Conversion in tabular form.

FIG. 13 illustrates an example of details of the disclosed metadata Average Picture Level in tabular form.

FIG. 14 illustrates an example of details of the disclosed metadata intended color in tabular form.

DEFINITIONS

Throughout the present disclosure, Reference Mode (RM) is defined as a playback state of a target display where the target display presents the video content completely faithful to the original creative intent. This playback state may be achieved by setting the target display in a particular display mode with associated display settings. The display settings of the particular display mode may be further adjusted to preserve the original creative intent.

Frame Rate Conversion refers to the conversion between different video frame rates (e.g., from 60 frames per second to 120 frames per second, and the like). Frame rate conversion is the duplication—potentially involving motion estimation and motion compensation—or reduction of frames in order to display the content on a video device with a different frame rate.

Perceptual Quantization (PQ) is an efficient method to encode high dynamic range (HDR) images. Each consecutive pair of code values differ by just less than a perceivable step across the entire dynamic range, providing very efficient use of code values. Examples of using PQ coding and decoding can be found in Report ITU-R BT. 2390, *"High dynamic range television for production and international programme exchange,"* ITU, 2016. Alternatives to using PQ include using the traditional "gamma" and hybrid log-gamma (HLG) signal parameters.

DETAILED DESCRIPTION

Video content type metadata for high dynamic range (HDR) is described herein. In the following description, for the purposes of explanation, numerous specific details are set forth in order to provide a thorough understanding of the present disclosure. It will be apparent, however, that the presently claimed subject matter may be practiced without these specific details. In other instances, well-known structures and devices are not described in exhaustive detail, in order to avoid unnecessary occluding, obscuring, obfuscating the present disclosure.

Figure 1:
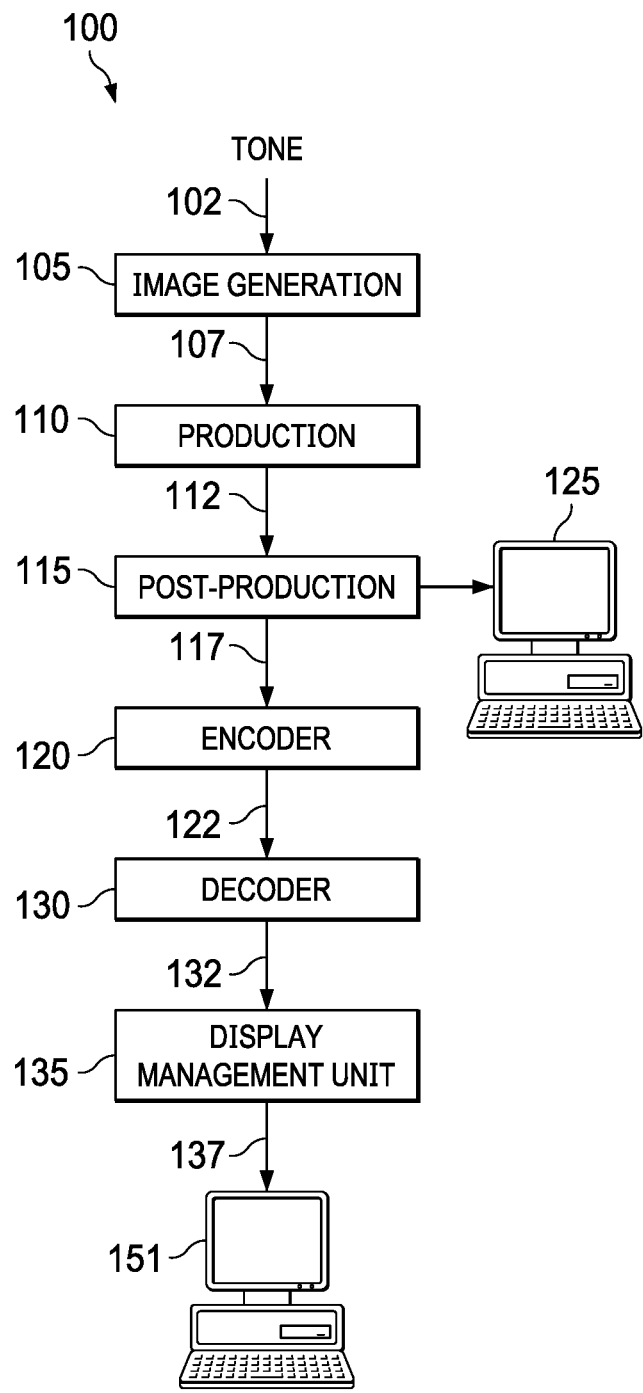
FIG. 1 depicts an example process of a video delivery pipeline showing various stages from video capture to video content display.

FIG. 1 depicts an example process of a video delivery pipeline 100 showing various stages from video capture to video content display. A sequence of video frames 102 is captured or generated using image generation block 105. Video frames 102 may be digitally captured (e.g. by a digital camera) or generated by a computer (e.g. using computer animation) to provide video data 107. Alternatively, video frames 102 may be captured on film by a film camera, in which case the film is converted to a digital format to provide video data 107. In a production phase 110, video data 107 is edited to provide a video production stream 112.

The video data of video production stream 112 is then provided to a processor at a post-production block 115 for post-production editing. Editing at post-production block 115 may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at post-production block 115 to yield a final version 117 of the production for distribution. During post-production editing of post-production block 115, video images are viewed on a reference display 125.

Following post-production at post-production block 115, video data of final version 117 may be delivered to an encoder 120 for delivering downstream to decoding and playback devices such as television sets, set-top boxes, movie theaters, and the like. In some embodiments, encoder 120 may include audio and video encoders, such as those defined by ATSC, DVB, DVD, Blu-Ray, and other delivery formats, to generate a coded bitstream 122. In a receiver, coded bitstream 122 is decoded by a decoder 130 to generate a decoded signal 132 representing an identical or close approximation of the video data corresponding to final version 117. The receiver may be attached to a target display 151, which may have completely different characteristics from reference display 125. In that case, a display management unit 135 may be used to map the dynamic range of decoded signal 132 to the characteristics of the target display 151 by generating display-mapped signal 137. Target display 151 may be a reference monitor, computer monitor or display, a television (TV) set, a head-mounted display, a virtual retinal display, or the like.

Dolby Vision™ is an end-to-end suite that enables the creation and distribution of content mastered with a high dynamic range and wide color gamut. Dolby Vision display management matches the capability of a given television by using a series of algorithms to map the signal to any Dolby Vision consumer television. This creates an optimal and seamless video experience for the viewer.

An end-to-end suite that enables the creation and distribution of content with high dynamic range and wide color gamut, such as Dolby Vision, includes video data as well as metadata. For example, there are different levels of metadata within Dolby Vision which are called level 1 (L1) to level 10 (L10). Examples of the description of such metadata are described in WIPO Publication WO2019/050972, "Tone-curve optimization method and associated video," by R. Atkins et al., which is incorporated herein by reference in its entirety. A digital video bitstream and methods of generating a digital video bitstream and playing back video content according to the present disclosure provide solutions to the problem of preserving the creative intent at a decoder or a target display, as well as providing a solution for identifying the category of a video content at the decoder or target display in order to adjust display settings according to the identified category of video content.

A new set of metadata is introduced within high dynamic range and wide color gamut video creation and distribution suite, such as Dolby Vision, referred to, without limitation, herein as level 11 (L11), whereby the intent of the content creators regarding the characteristics of playback of the video content at a decoder or target display are specified. The L11 metadata allows the creative intent of the content creator to be communicated to a decoder or target display. This content aware metadata knows the best way for the target display to present the content. The L11 metadata includes many fields in order to make it effortless for the content creator to tag their content.

It should be understood that the digital video bitstream and methods of generating a digital video bitstream and playing back video content according to the present disclosure are generically applicable to high dynamic range and wide color gamut video creation and distribution suites, and the term L11 is used herein for illustration purposes only and is not intended to impose a limitation on the presently disclosed digital video bitstream and methods of generating a digital video bitstream and playing back video content.

Target displays, such as TVs, come with different display modes but it is up to the user to decide which display mode to choose. For example, when a user is watching a movie, s/he may choose to change the display mode on the TV. However, most users are not sophisticated enough nor do they feel that it is worth the time to change the display mode every time they watch different types of content. Selecting a particular display mode causes a target display to apply display settings that are associated to the selected display mode.

The present disclosure provides an apparatus and a method to identify automatically the category of video content such that a target display can make a smart determination about the display mode to be in. The present disclosure provides an apparatus and a method to add awareness to the video content by the introduction of the L11 metadata. Further, the present disclosure enables the determination of the best way to present the video content at a target display such that the target display does not have to guess the category of video content, nor does the user have to guess the category of video content. Moreover, the presently claimed subject matter allows for the user and target display not needing to perform anything during playback of video content. The target display simply performs what the L11 metadata instructs it to do.

Today target displays perform video content processing based on guesswork, however that is not a very accurate process. By having content aware metadata, the target display is notified of the right processing for the video content. This ensures that the decision making process at the target display is informed and that the right result is reached every time. For example, the target display is informed by the L11 metadata that the content is sport, thus the target display switches to a display mode during the playback that corresponds to the sport content such that the associated display settings of the display mode are set accordingly.

According to an embodiment of the present disclosure, a video bitstream includes metadata that communicates to the target display the category of the video content within the bitstream. This metadata may include numerous fields that denote characteristics of the video content such as content type, and content sub-type. Furthermore, the chosen category of the video content may be refined by explicitly specifying adjustments of particular display settings like intended white point, whether or not to use the video in Reference Mode, intended sharpness, intended noise reduction, intended MPEG noise reduction, intended Frame Rate Conversion (FRC), intended Average Picture Level (APL), and intended color. A number of fields are added within the L11 metadata with a specific hierarchy.

The L11 metadata is designed to make it effortless for the content creators to tag their content: 1) The most straight forward method for the content creator is to do nothing, which results in default behavior; 2) The second most straight forward method for the content creator is to communicate to the target decoder or target display the category of content the video is, for example, movie, game, or sport. Depending on this metadata information, the target display, such as a TV, makes a high level determination on the display mode, for example the TV switches to movie, game, or sport mode. The TV will look up appropriate detail display settings of the display mode that correspond to those categories, respectively; 3) Finally, the L11 metadata enables the content creator to further specify the details of display settings at the target display that lead to a refinement of the selected display mode. For example, the content creator can specify the content sub-type, for example for the case of sport content, indicate whether the sport is a winter sport or a water sport. Moreover, the content creator can specify, for example, that the video content will look best on the target display with Frame Rate Conversion set to high. The L11 metadata is hierarchical allowing the content type or content sub-type to be set to default where there is a lack of information. Further, the L11 metadata enables the override of those defaults by the metadata on a case by case basis.

Not only the L11 metadata can be specified by content creators, it can also be specified at an application level. For example, if a smart Blu-Ray player is playing from a movie streaming service, such as Netflix® (Netflix® is a registered trademark of Netflix Inc.), the smart Blu-Ray player can set the metadata to movie or drama setting; If the smart Blu-Ray is playing from a game, it can tag content as game; If it is playing from a broadcast set top box, it can set it to sport or whatever the content may be. Thus, the L11 metadata permits other parties other than the original content creator to specify the type of the video content. In that sense, to preserve creative intent, it is important to not just provide content aware metadata, but also provide an indication of how these metadata were created—for example, by the content creator, or by intermediates.

The L11 metadata allows for multiple points where the L11 metadata can be added to the video content. In an embodiment, in order to indicate the source of the L11 metadata, the L11 metadata contains a reference mode flag (also to be referred to as the L11 Reference Mode flag, or, for short, the L11 RM flag) that can be set to TRUE or FALSE. The original content creator can add the L11 metadata for a particular reason, for example, the content creator has created a game and would like to have the game played back such that the game looks more blue and looks very sharp on the target display. The content creator can then set the L11 RM flag to TRUE, i.e. meaning that even if a target display is in highest quality mode, it should apply the content aware metadata to preserve the creative intent.

On the other hand, if a content is, for example, a game and the L11 metadata has been added further downstream by a third party, such as an automatic image processing, the L11 RM flag would be set to FALSE meaning that if the target display is in highest quality mode, it should not apply the L11 metadata because the L11 metadata was added by someone other the content creator, thus the target display would not be preserving the intent of original content creator. Setting the L11 RM flag to FALSE indicates that the intent of content creator has been altered. The utilization of the L11 RM flag in this fashion enables the metadata to be the same while its usage can be modified depending on the status of the flag. For example, if a video content is played back in reference mode, where there is a lot of processing performed in order to preserve the original intent of creator and highest quality is important, then during playback the L11 RM flag is used to communicate to the target display whether or not the content aware metadata should be used in reference mode: i) The content aware metadata should be used in reference mode if the metadata was created by an original content creator (flag status set to TRUE); ii) The content aware metadata should not be used in reference mode if the metadata was created downstream by someone other than the original content creator (flag status set to FALSE). This is one of the key aspects of the present disclosure. It gives importance to whether or not the target display should listen to the content aware metadata if the viewer's intention is to view the video content in reference mode.

Figure 2:
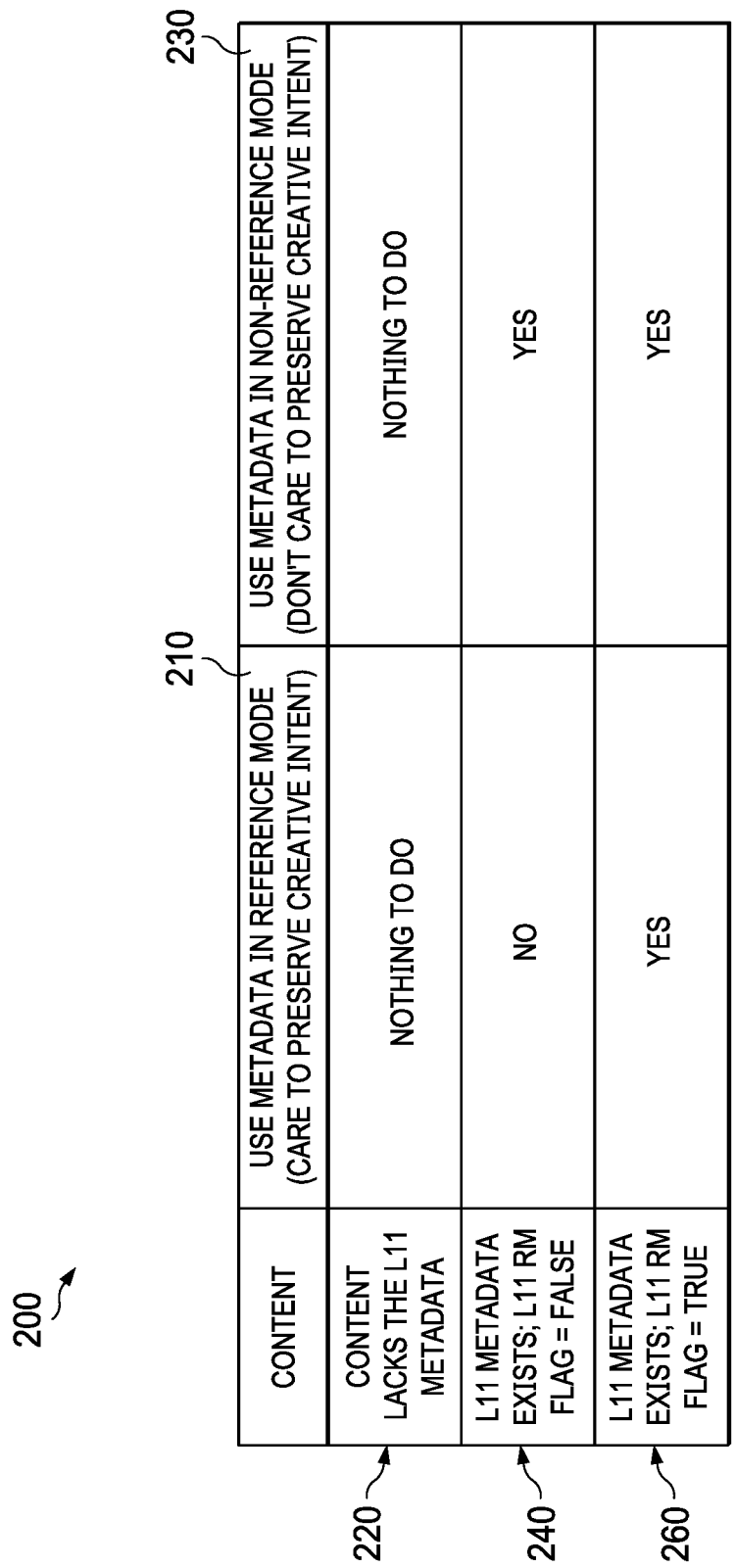
FIG. 2 illustrates an exemplary use of a disclosed metadata flag in tabular form.

The use of the L11 RM flag is depicted further in tabular form in FIG. 2 table 200. In this exemplary table, "use metadata reference mode" (210) refers to state of a target display during playback. This table further illustrates the scenarios described in the previous paragraph: 1) In the first row of the table (220), there is no metadata, thus metadata cannot be used in reference mode or non-reference mode (230); 2) In the second row (240), L11 metadata exists, but the L11 RM flag is FALSE, therefore, to preserve creative intent, the target display is instructed to not use the L11 metadata in the Reference Mode. The target display is still allowed to use the L11 metadata during processing when it is in non-in reference mode; 3) In the third row (260), L11 metadata exists and the L11 RM flag is TRUE, therefore the target display is instructed that it can use the L11 metadata in Reference Mode and in all other non-Reference Modes.

Figure 3:
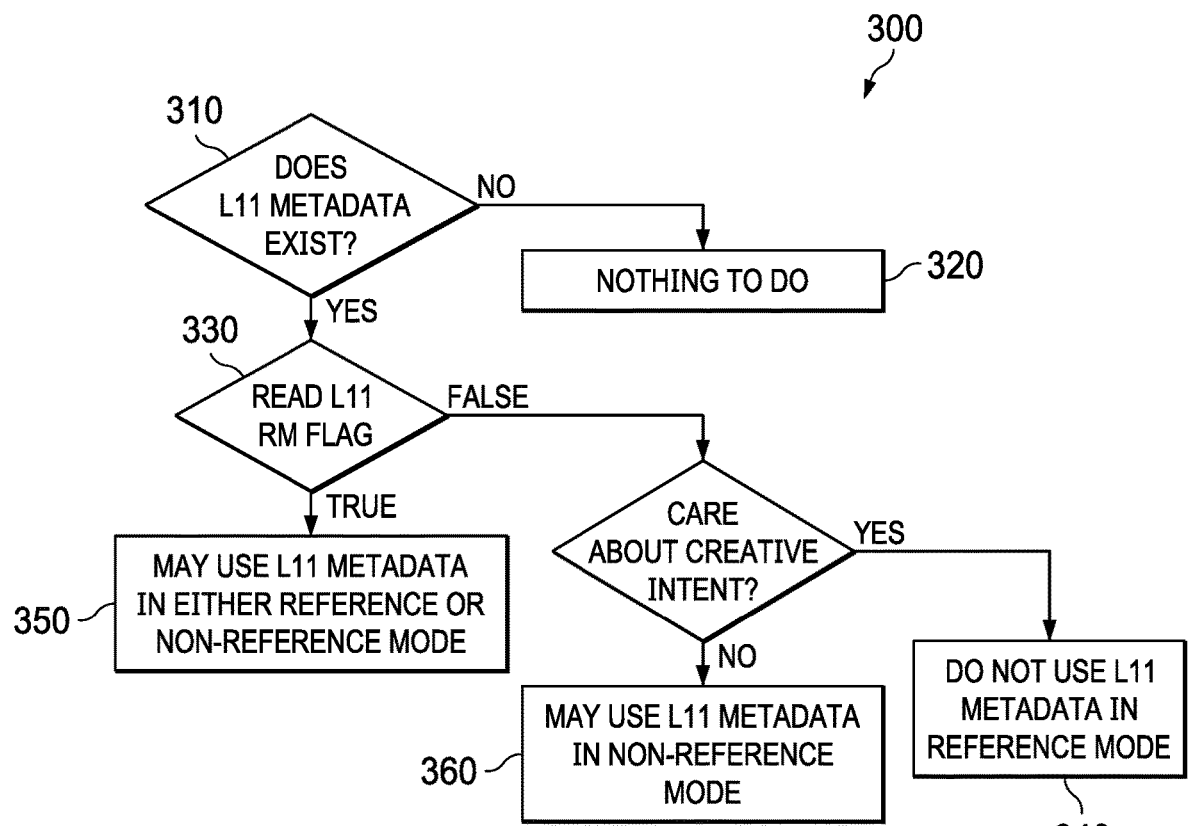
FIG. 3 illustrates an exemplary use of the L11 Reference Mode (RM) flag in a flow chart.

FIG. 3 illustrates an exemplary use of the L11 RM flag in flow chart 300. A decoder or target display first looks to see if L11 metadata exists (310) within the video content. If the answer is no, the decoder or target display has nothing else to do (320). If the answer is yes, then the decoder or target display looks to see if the L11 RM flag is TRUE or FALSE (330).

If the flag is FALSE, and the user cares about preserving the creative intent, then the L11 metadata should not be used in Reference Mode (340). If the flag is FALSE and the user does not care about preserving creative intent, then the L11 metadata may be used in the target display's non-reference mode (360). If the L11 RM flag is TRUE, the decoder or target display may use the metadata both in Reference Mode and in non-Reference Mode (350).

The following figures with their respective tables illustrate exemplary embodiments of L11 metadata fields and exemplary values used to populate these fields.

Figure 4A:
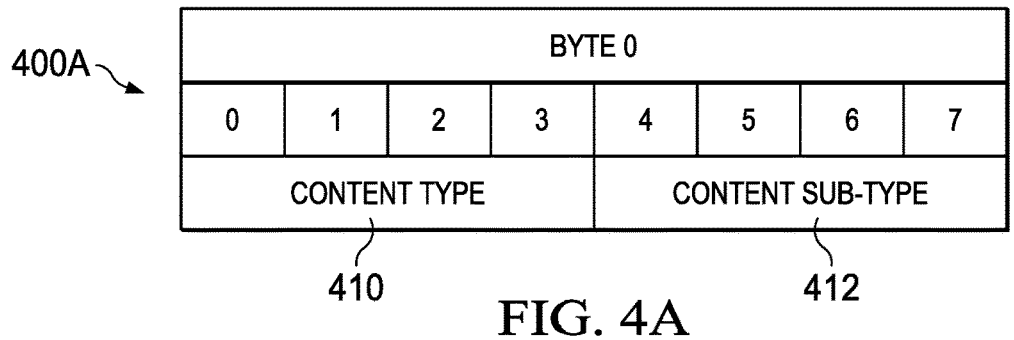
FIGS. 4A-4D illustrates an example of the disclosed metadata details in tabular form.
Figure 4B:
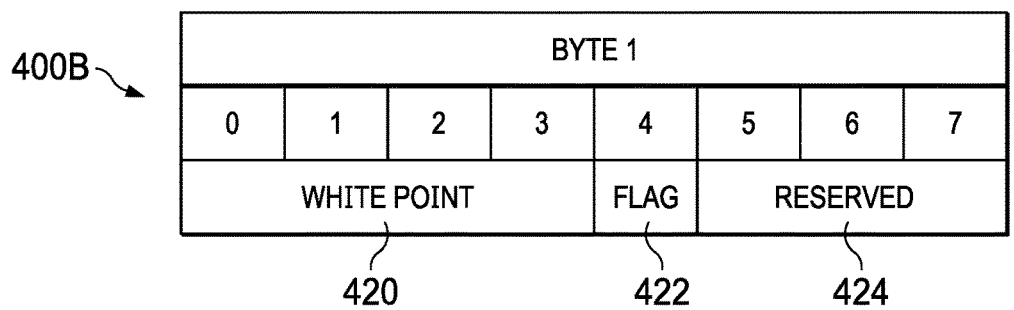
Figure 4C:
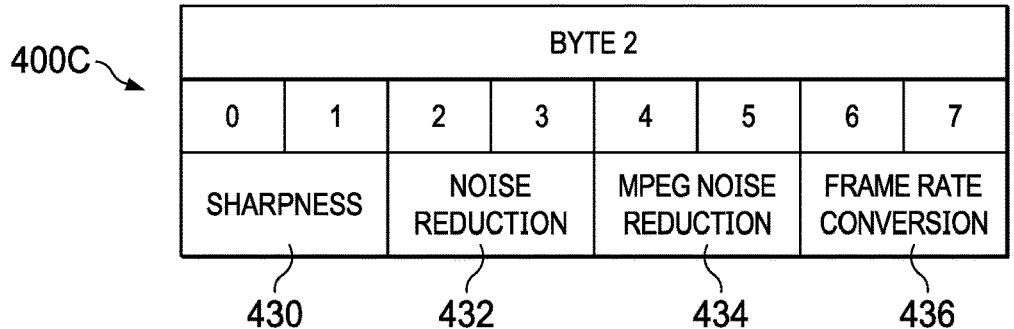
Figure 4D:
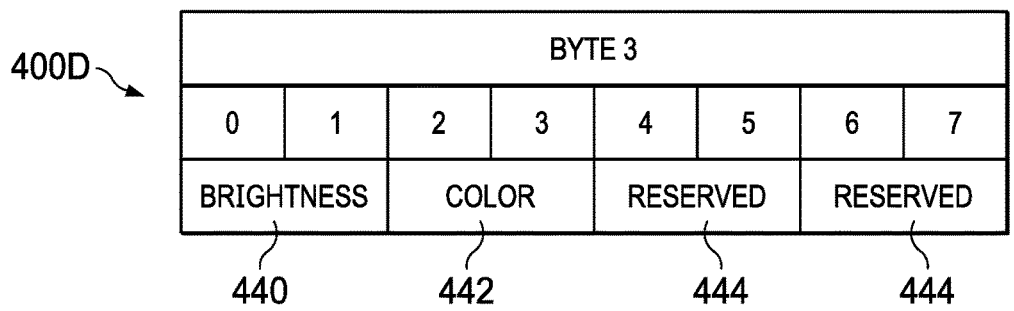

FIGS. 4A-4D illustrate exemplary L11 metadata details in tabular form. In FIG. 4A table 400A, the L11 metadata is shown having content type (410) and content sub-type (412). FIG. 4B table 400B shows bits for white point (420), for the RM flag (422), and for future use (424). FIG. 4C table 400C shows bits for sharpness (430), noise reduction (432), MPEG noise reduction (434) and Frame Rate Conversion (436). FIG. 4D table 400D shows bits for brightness (440), for color (442), and for future use (444).

Figure 5:
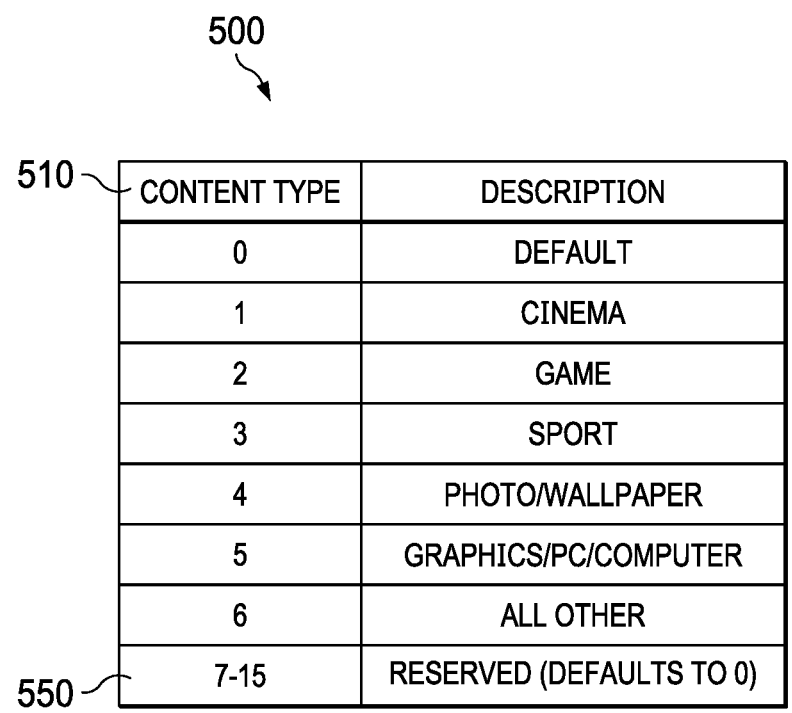
FIG. 5 illustrates an example of details of the disclosed metadata content type in tabular form.

FIG. 5 illustrates further exemplary details of content type in tabular form. Table 500 describes the different types of content type (510) within L11 metadata. L11 metadata uses a small payload, for example, 4 bits, that are updated per scene. The reserved values (550) are for future content types and will default to "0" for playback devices that do not have the definition of metadata filed, in order to maintain consistency with current out of the box user experience.

FIG. 6 illustrates an example of L11 typical categories, each corresponding to a particular display mode comprising a number of display settings in tabular form. Table 600 is populated during the Perceptual Quantizer (PQ) tuning stage, in collaboration between content creation and distribution suite proprietor, such as Dolby, and a display target original equipment manufacturer (OEM), and optionally also a content creator.

FIG. 7 illustrates exemplary details of L11 content sub-type in tabular form. L11 metadata uses additional 4 bits that are updated per scene. The content sub-type (720) modifies default behavior from content type (510) by further refining the content type which causes the target display to adjust particular display settings associated with the selected content sub-type. It allows an OEM to further fine-tune post-processing algorithms to enable differentiation. A content creator can simply populate the table with "0" if they prefer.

Figure 8:
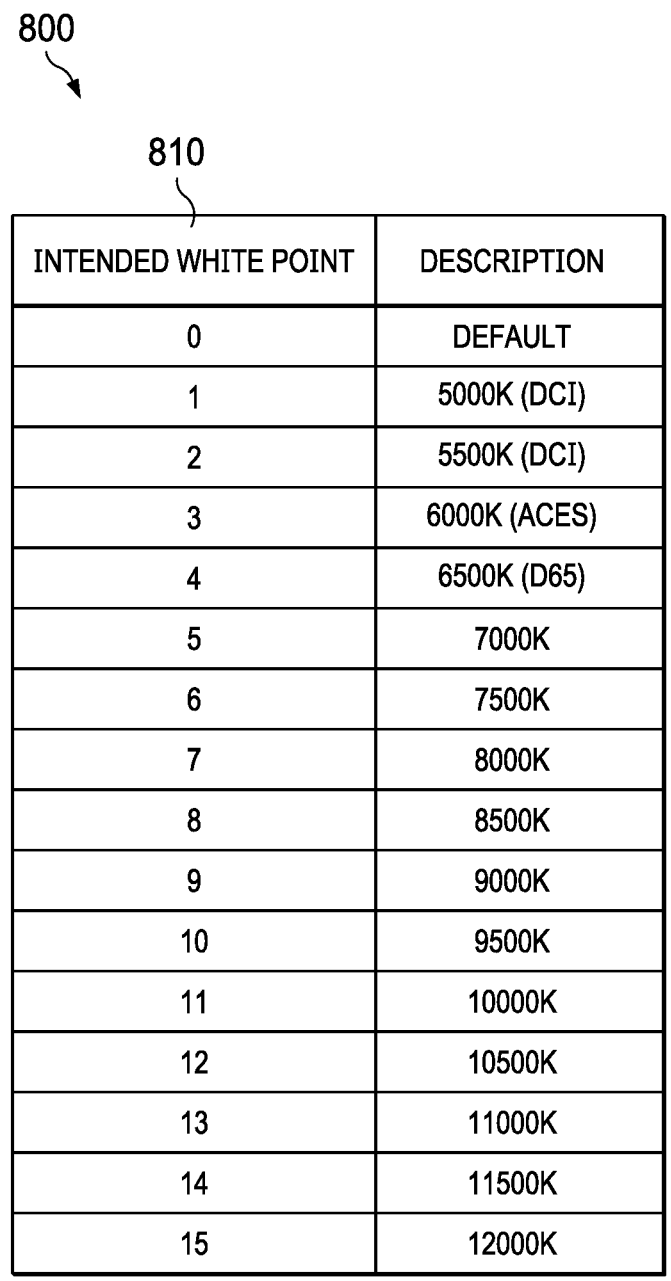
FIG. 8 illustrates an example of details of the disclosed metadata intended white point in tabular form.

FIG. 8 illustrates exemplary details of L11 metadata intended white point in tabular form. Table 800 guides the rendered white point of the picture. White point can either be bypassed via an Audio Plug-in (API) system level or can be applied within Dolby Display Management (DM), in which case a target display would be calibrated to native temperature. Setting "0" for default will use the default white point for the content type. The intended white point (810) is filtered at the target display during playback to prevent sudden changes.

FIG. 9 illustrates exemplary details of L11 metadata intended sharpness in tabular form. Table 900 guides the detail enhancement/sharpening algorithm at the target display. Setting "0" for default will use the default setting for the content type. OFF corresponds to no added sharpness. Images are resized if needed using bilinear interpolation. HIGH corresponds to maximum sharpness enhancement. Setting between OFF and HIGH controls the strength of the sharpness. Utilizing this table, the transition between sharpness settings should be seamless. The intended sharpness (910) is filtered at the target display during playback to prevent sudden changes.

FIG. 10 illustrates exemplary details of L11 metadata intended noise reduction in tabular form. Table 1000 guides the noise reduction algorithm for random noise. Setting "0" for default will use the default setting for content type. OFF corresponds to no noise reduction. HIGH corresponds to maximum noise reduction. Setting between OFF and HIGH controls the strength of the noise reduction. Utilizing this table, the transition between different settings should be seamless. The intended noise reduction (1010) is filtered at the target display during playback to prevent sudden changes.

FIG. 11 illustrates exemplary details of L11 metadata intended MPEG noise reduction in tabular form. Table 1100 guides the noise reduction algorithm for compression noise. Setting "0" for default will use the default setting for content type. OFF corresponds to no noise reduction. HIGH corresponds to maximum noise reduction. Setting between OFF and HIGH controls the strength of the noise reduction. Utilizing this table, the transition between different settings should be seamless. The intended MPEG noise reduction (1110) is filtered at the target display during playback to prevent sudden changes.

FIG. 12 illustrates exemplary details of L11 metadata Frame Rate Conversion (FRC) in tabular form. Table 1200 guides the Frame Rate Conversion algorithm. Setting "0" for default will use the default FRC setting for content type. OFF corresponds to no frame rate conversion.

Frames will only be replicated if needed. HIGH corresponds to maximum Frame Rate Conversion. Frames will be smoothly interpolated up to the maximum refresh rate of the target display. Setting between OFF and HIGH controls the strength of the FRC. Frames will be interpolated a fractional amount between the original point and the mid-way point. Utilizing this table, the transition between different FRC settings should be seamless (i.e. no black frames). As a consequence, bypassing the FRC entirely cannot be triggered by L11 as this typically causes black frame. There exists are mechanisms for requesting FRC, such as Auto Low Latency Mode (ALLM) in HDMI 2.1. The intended Frame Rate Conversion (1210) is filtered at the target display during playback to prevent sudden changes.

FIG. 13 illustrates exemplary details of L11 metadata Average Picture Level (APL) in tabular form. Table 1300 guides the Average Picture Level. Setting "0" for default will use the default setting for content type. LOW corresponds to slightly darker brightness. MEDIUM corresponds to average brightness. HIGH corresponds to maximum brightness. Utilizing this table, the transition between different settings should be seamless. The intended Average Picture Level (1310) is filtered at the target display during playback to prevent sudden changes.

FIG. 14 illustrates exemplary details of L11 metadata intended color in tabular form. Table 1400 guides the color saturation. Setting "0" for default will use the default setting for content type. LOW corresponds to slightly lower saturation. MEDIUM corresponds to average saturation. HIGH corresponds to maximum saturation. Utilizing this table, the transition between different settings should be seamless. The intended color saturation (1410) is filtered at the target display during playback to prevent sudden changes.

The default settings in L11 metadata are now described further. As an example, when the target display is in a smart mode, such as Dolby Smart Mode, video content without L11 metadata may default to DEFAULT (e.g., in FIG. 5, content type=0). "All other" (e.g., in FIG. 5, content type=6) may be considered the "average best setting" for all content (e.g. sport, drama, soap opera, commercials, games and movies). During post-production (115), a studio may check the quality of a release under different display modes (say, vivid, cinema/movie, etc.). If a studio puts their rendering display (125) into "cinema home" to review their content, it may not necessarily see the same viewer experience as someone using smart mode with L11 set to "cinema." The same is true for game, sport and standard modes. This may occur because the two displays may differ on how they define their white point or other calibration parameters.

The generation of L11 metadata is now described. As an example, image generation devices can populate fields to configure the target display device into a desired mode if L11 is not specified in the content. Further, if L11 is not specified in the content, an application (app) level can populate fields to configure the target display device. For example, in an embodiment, PS4/Xbox game apps set to game, Blu-Ray player and Netflix apps set to cinema, or NBC sports app set to sport. Moreover, authoring tools can populate fields to configure the target display device also. In this case, the authoring tools resolve and enable drop-down menu for content type. Hollywood studios are always set to cinema. Broadcasters are set to "All Other" unless explicitly covering sports or cinema.

Figure 15:
FIG. 15 illustrates an example of broadcast playout server mapping in tabular form.

An example of broadcast playout server mapping is provided in FIG. 15 in tabular form. Table 1500 illustrates generation of L11 metadata from European Broadcast Union (EBU) Core Metadata (EBUCore) Tech 3293 (1410), by mapping L11 metadata from EBU Core Metadata Tech 3293 (see, Tech 3293, "EBU Core metadata set (EBUCore)," specification v1.9, MIM-AI, EBU, January 2019).

L11 playback implementation at target display is described now. As an example, the user selects smart mode, such as Dolby Smart Mode™, on a target display which may also be the factory default. As content type changes, the target display remains in the smart mode. Metadata changes are seamless, i.e. there are no flickering of image content. The user can change to legacy picture modes at any time.

The following descriptions of further embodiments will focus on the differences between it and the previously described embodiment. Therefore, features which are common to both embodiments will be omitted from the following description, and so it should be assumed that features of the previously described embodiment are or at least can be implemented in the further embodiment, unless the following description thereof requires otherwise.

In another embodiment of the present disclosure the RM flag is utilized in more situations than simply during playback. For example, if the metadata does not represent creative intent, the apparatus and methods according to this embodiment allow someone downstream (encoder, distributor, playback device) from the creator to modify, create and/or overwrite the metadata. However, if the metadata represents creative intent, the metadata is not allowed to be modified downstream.

In an alternate embodiment of the present disclosure more information is included about who populated the metadata. The apparatus and methods according to this embodiment allow the use of more bits for the RM flag field. As an example, information such as the stage of content creation and distribution and the name of the company that populated the L11 metadata can be stored in the RM flag. This information can be attached to the content and the metadata. This information can be utilized to know how to interpret and apply the metadata. Some examples are: i) applying or not applying the metadata in a playback device, depending on the identification of who populated the metadata and the playback priorities; ii) allowing or not allowing various distribution participants, including, for example, Dolby and its partners, to further modify, enhance or overwrite the metadata at various stages of content creation and distribution depending on who populated it; iii) exposing or not exposing some of the metadata, depending on who populated it and where the metadata is potentially being exposed (such as exposing the content type in a consumer visible GUI).

In yet another alternate embodiment of the present disclosure, in a content format that is conceptually similar to blockchain, downstream participants could attach additional and/or alternative L11 metadata sets or records. In this case it would be extremely important to know who populated each set or record. For example, a content service provider could have their preferred look, defined by one consistent set of L11 metadata for all their content, while a different set of L11 metadata would be maintained for each content piece as defined by the original content creator. This would allow different consumer experiences depending on which set of L11 metadata is used. The extended RM flag for each set of L11 metadata would inform the decision regarding which set of L11 metadata to use.

A number of embodiments of the disclosure have been described. Nevertheless, it will be understood that various modifications may be made without departing from the scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The methods and systems described in the present disclosure may be implemented in hardware, software, firmware or combination thereof. Features described as blocks modules or components may be implemented together or separately using a combination of hardware, software and firmware. The software portion of the methods of the present disclosure may comprise a computer-readable medium which comprises instructions (e.g. executable program) that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA).

Various aspects of the present invention may be appreciated from the following enumerated example embodiments (EEEs):

EEE 1. A method of generating a digital video bitstream with metadata, wherein the metadata include a flag indicative of preserving creative intent, the method comprising: setting one or more additional fields in the metadata to indicate content type of the digital video bitstream, and setting the flag in the metadata to indicate whether or not the one or more additional fields are to be used when the digital video bitstream is decoded in a reference mode in which the digital video bitstream is to be played and/or displayed according to original creative intent.

EEE 2. The method of EEE 1, wherein the one or more additional fields in the metadata comprise at least one of: video content type, a video content sub-type, a video content intended white point, a video content intended sharpness, a video content intended noise reduction, a video content intended MPEG noise reduction, a video content intended frame rate conversion, a video content average picture level, and a video content intended color.

EEE 3. The method of EEE 2, wherein if the metadata is generated by a video content creator, the flag is set to a first logical value, and if the metadata is generated by a third party, the flag is set to a second logical value.

EEE 4. The method of EEE 2, wherein the metadata is generated by a video content creator, by an automatic image processor, or at an application level.

EEE 5. The method of any of EEEs 1-4, wherein the metadata is generated by a video content creator, by an automatic image processor, or at an application level.

EEE 6. The method of any of EEEs 1-5, wherein if the metadata is generated by a video content creator, the flag is set to a first logical value, and if the metadata is generated by a third party, the flag is set to a second logical value.

EEE 7. The method of any of EEs 1-6, wherein a mapping from other metadata is used to generate the metadata.

EEE 8. The method of EEE 7, wherein the other metadata is European Broadcast Union Core Metadata Tech 3293.

EEE 9. A method of playing back a video content with metadata, wherein the metadata include a flag indicative of preserving creative intent, the method comprising:
receiving at a decoder the video content, and instructing the decoder based on the status of the flag whether or not the one or more additional fields are to be used when the video content is decoded in a reference mode in which the digital video bitstream is to be played and/or displayed according to original creative intent.

EEE 10. The method of EEE 9, wherein if the flag is set to a first logical value the decoder is instructed to utilize the metadata to determine the video content type in the reference mode and in a non-reference mode.

EEE 11. The method of EEE 9, wherein if the flag is set to a second logical value the decoder is instructed to ignore the metadata in the reference mode and to utilize the metadata in a non-reference mode.

EEE 12. The method of any of EEEs 9-11, wherein the metadata comprises at least one of: video content type, a video content sub-type, a video content intended white point, a video content intended sharpness, a video content intended noise reduction, a video content intended MPEG noise reduction, a video content intended frame rate conversion, a video content average picture level, and a video content intended color.

EEE 13. A digital video bitstream, comprising:
a video content; and
metadata including a flag indicative of creative intent, the metadata having one or more additional fields to indicate content type of the digital video bitstream,
wherein
the flag in the metadata indicates whether or not the one or more additional fields are be used when the digital video bitstream is decoded in a reference mode in which the digital video bitstream is to be played and/or displayed according to original creative intent.

EEE 14. The digital video bitstream of EEE 13, wherein the one or more additional fields in the metadata comprise at least one of: video content type, a video content sub-type, a video content intended white point, a video content intended sharpness, a video content intended noise reduction, a video content intended MPEG noise reduction, a video content intended frame rate conversion, a video content average picture level, and a video content intended color.

EEE 15. A method of indicating use or non-use of metadata within a video bitstream, the method comprising:
providing the digital video bitstream of EEE 13 or EEE 14;
setting the flag to a first logical value if the metadata is generated by a video content creator, and to a second logical value if the metadata is generated by a third party.

EEE 16. A method of playing back a video bitstream with high dynamic range, the method comprising:
providing the digital video bitstream of EEE 13 or EEE 14, and
instructing a video decoder to utilize the metadata to determine the video content type in the reference mode and in a non-reference mode if the flag is set to a first logical value.

EEE 17. A method of playing back a video bitstream with high dynamic range, the method comprising:
providing the digital video bitstream of EEE 13 or EEE 14, and
instructing a video decoder to ignore the metadata in the reference mode and to utilize the metadata in a non-reference mode if the flag is set to a second logical value.

EEE 18. A computer-readable medium comprising instructions that, when executed, perform the steps of the methods according to any one of EEEs 1-12 or EEEs 15-17.

The invention claimed is:

1. A method of generating a digital video bitstream from video content, wherein the digital video bitstream comprises content aware metadata, the content aware metadata including:
one or more category fields indicative of a category of the video content of the digital video bitstream, wherein the one or more category fields cause a target display to select display settings for displaying the video content in a display mode corresponding to the category of the video content, and
a reference mode flag indicative of whether the one or more category fields cause the target display to select display settings for displaying the video content in a reference mode, the reference mode representing a display mode having display settings that preserve a creative intent of the creator of the video content,
the method comprising:
setting the one or more category fields in the content aware metadata according to the category of the video content, and
setting the reference mode flag in the content aware metadata to indicate whether or not the one or more category fields are indicative of the reference mode.

2. The method of claim 1, wherein the one or more category fields in the content aware metadata comprise at least one of: a video content type, and a video content sub-type that refines the video content type.

3. The method of claim 1, wherein setting the one or more category fields in the content aware metadata comprises:
receiving one or more European Broadcast Union Core Metadata Tech 3293 content types, and
setting the one or more category fields to values that correspond to the received one or more European Broadcast Union Core Metadata Tech 3293 content types.

4. The method of claim 1, wherein the content aware metadata further include:
one or more adjustment fields indicative of video content intended adjustments of the display settings of the target display when displaying the video content on the target display,
wherein the one or more adjustment fields cause the target display to adjust at least a portion of the selected display settings for displaying the video content in the display mode, thereby refining the applied display mode with the adjusted display settings.

5. The method of claim 4, wherein the one or more adjustment fields in the content aware metadata are indicative of at least one of: a video content intended white point, a video content intended sharpness, a video content intended noise reduction, a video content intended MPEG noise reduction, a video content intended frame rate conversion, a video content average picture brightness level, and a video content intended color.

6. A method of playing back a video content on a target display in a reference mode, the reference mode representing a display mode having display settings that preserve a creative intent of the creator of the video content, the method comprising:

receiving a digital video bitstream comprising the video content and content aware metadata, the content aware metadata including:
  one or more category fields indicative of a category of the video content of the digital video bitstream, and
  a reference mode flag indicative of whether the one or more category fields cause the target display to select display settings for displaying the video content in the reference mode,
decoding, at a decoder, the video content,
retrieving the reference mode flag from the content aware metadata,
if the reference mode flag is indicative of one or more category fields causing the target display to select display settings for displaying the video content in the reference mode:
  determining a category of the video content from the one or more category fields of the content aware metadata,
  determining the display mode that corresponds to the determined category of the video content,
  applying the display settings of the determined display mode to the target display, and
  displaying the video content,
if the reference mode flag is not indicative of one or more category fields causing the target display to select display settings for displaying the video content in the reference mode:
  displaying the video content without applying the content aware metadata.

7. The method of claim 6, wherein the one or more category fields in the content aware metadata comprise at least one of: a video content type, and a video content sub-type that refines the video content type.

8. The method of claim 6, wherein the content aware metadata further include:
  one or more adjustment fields indicative of video content intended adjustments of the display settings of the target display when displaying the video content on the target display,
  wherein the one or more adjustment fields cause the target display to adjust at least a portion of the selected display settings for displaying the video content in the display mode, thereby refining the applied display mode with the adjusted display settings.

9. The method of claim 8, wherein the one or more adjustment fields in the content aware metadata are indicative of at least one of: a video content intended white point, a video content intended sharpness, a video content intended noise reduction, a video content intended MPEG noise reduction, a video content intended frame rate conversion, a video content average picture brightness level, and a video content intended color.

10. A non-transitory computer-readable medium having stored thereon encoded digital video stream data for decoding by a decoder, the digital video stream data comprising:
  a video content; and
  content aware metadata including:
    one or more category fields indicative of a category of the video content of the digital video stream data, wherein the one or more category fields cause the decoder in a target display to select display settings for displaying the video content in a display mode corresponding to the category of the video content, and
    a reference mode flag indicative of whether or not the one or more category fields cause the decoder in a target display to select display settings for displaying the video content in a reference mode, the reference mode representing a display mode having display settings that preserve a creative intent of the creator of the video content.

11. The computer-readable medium of claim 10, wherein the one or more category fields in the content aware metadata comprise at least one of: a video content type, and a video content sub-type that refines the video content type.

12. The computer-readable medium of claim 10, wherein the content aware metadata further include:
  one or more adjustment fields indicative of video content intended adjustments of the display settings of the target display when displaying the video content on the target display,
  wherein the one or more adjustment fields cause the decoder in the target display to adjust at least a portion of the selected display settings for displaying the video content in the display mode, thereby refining the applied display mode with the adjusted display settings.

13. The computer-readable medium of claim 12, wherein the one or more adjustment fields in the content aware metadata are indicative of at least one of: a video content intended white point, a video content intended sharpness, a video content intended noise reduction, a video content intended MPEG noise reduction, a video content intended frame rate conversion, a video content average picture brightness level, and a video content intended color.

\* \* \* \* \*